INVENTOR
SUSUMU EGAWA

BY Stevens, Davis, Miller & Mosher
ATTORNEYS

INVENTOR
SUSUMU EGAWA

BY Stevens, Davis, Miller & Mosher

ATTORNEYS

United States Patent Office 3,454,807
Patented July 8, 1969

3,454,807

STATIC CONVERGENCE DEVICE FOR A TRIPLE-GUN COLOR TELEVISION RECEIVER

Susumu Egawa, Osaka, Japan, assignor to Matsushita Electric Industrial Co., Ltd., Osaka, Japan, a corporation of Japan Filed Dec. 11, 1967, Ser. No. 689,613
Int. Cl. H01j *29/76, 29/46, 29/50*
U.S. Cl. 313—77 10 Claims

ABSTRACT OF THE DISCLOSURE

A static convergence device for a triple-gun color television receiver, which is simplified in construction, easily adjusted and manufactured at low cost as compared with the conventional devices of this type. The static convergence device disclosed herein is characterized in that there are provided a pair of convergence magnets, one of them being associated with one of the pole-pieces of said receiver and the other one being asosciated with the remaining two pole-pieces.

This invention relates to color television, and more particularly it pertains to a static color convergence device for a triple-gun color television receiver.

A primary object of this invention is to provide a simplified static convergence system for a color television set.

It is another object of this invention to simplify the convergence yoke assembly associated with a color picture tube most widely used at present such as a shadow-mask type color picture tube having three electron-guns arranged in a trigonal form, thereby providing such convergence system which is simplified in construction, manufactured at low cost and easily adjusted.

Other objects, features and advantages of this invention will become apparent from the following description taken in conjunction with the accompanying drawings, in which.

Figure 8B:
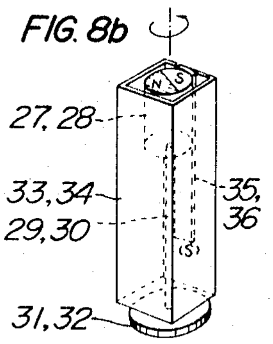
Figure 8A:
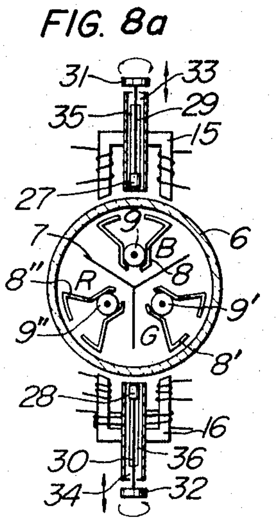
Figure 7A:
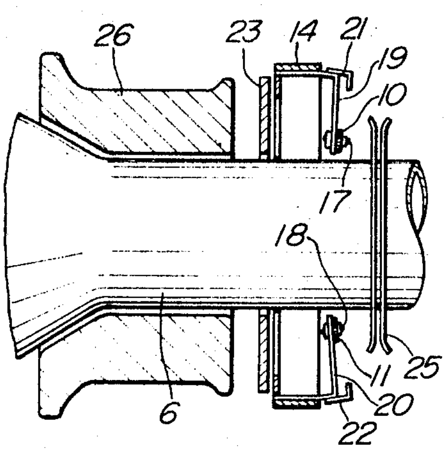
Figure 7B:
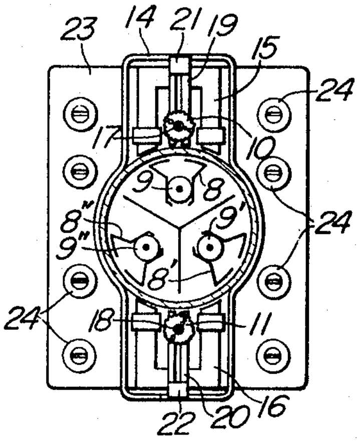

FIGURES 7*a* and 7*b* are a top plan view, partly in section, and a side view, partly in section, of the static convergence device according to an embodiment of the present invention, respectively; and FIGURES 8*a* and 8*b* are a top plan view, partly in section, and a partial enlarged view of the static convergence device according to another embodiment of the present invention.

Figure 1:
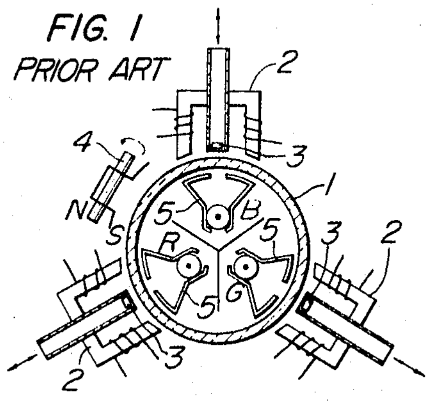
FIG. 1 PRIOR ART
FIGURE 1 is a schematic view showing a conventional convergence device for a color television receiver.
Figure 2:
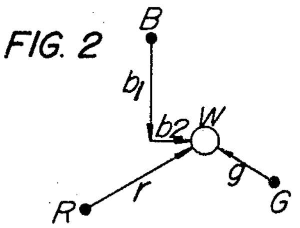
FIGURE 2 is a view showing the process of static convergence taking place in the device of FIGURE 1 when beam spots are viewed in the vicinity of the center of the screen.

Referring to FIGURE 1, there is shown a conventional convergence device, wherein three magnet means 2 are positioned around the neck portion 1 of a picture tube including three electron-guns R, G and B. Each of the magnet means 2 includes a static convergence magnet 3. A blue lateral magnet 4 is separately provided. Various forms of configuration have already been proposed. In principle, the device operates as folows. Magnetic fields produced by the magnets 3 are introduced to convergence pole-pieces 5 and serve as lateral fields with respect to the electron beams so as to radially displace the latter. The blue lateral magnet 4 serves to laterally displace only the "blue" beam. FIGURE 2 shows the process of static convergence with respect to beam spots in the vicinity of the center of the screen. The displacement by the static convergence is such that the beam spots are moved along straight lines at 120° with each other, as indicated by three vectors *r*, *g* and $b_1$. "Blue lateral" $b_2$ moves along a straight line substantially perpendicular to the vector $b_1$. That is, in the conventional convergence system for superimposing three electron-beams in the center portion of the screen upon each other, four magnets are used by which the beams are caused to be displaced along straight lines each having a fixed direction so that they are superposed upon each other in accordance with the four vectors (the vectors *r*, *g*, $b_1$ and $b_2$ in the foregoing example.)

Figure 3:
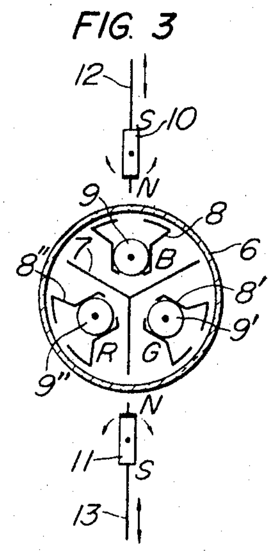
FIGURE 3 is a view similar to FIGURE 1, useful for explaining the operational principle of the static convergence device for a color television receiver according to the present invention.

With reference to FIGURE 3, description will now be made of the principle of the static convergence device of this invention. FIGURE 3 is a schematic view showing the neck portion of a picture tube cut in the vicinity of the screen, as viewed toward the electron guns. A Y-shaped shielding plate 7 is provided within the neck portion 6. In the spaces defined by the shielding plate 7 and the tubular wall of the neck portion 6 are provided pole-pieces 8, 8′ and 8″ each formed by two electrodes of bent metal sheets disposed in opposing relationship with each other. Electron guns 9, 9′ and 9″ are provided in one end portion of the neck portion 6 so that each electron beam is caused to pass between the two electrodes of each pole-piece. The above arrangement is completely the same as that of the conventional picture tube. In accordance with this invention, the convergence device includes a pair of permanent magnets, that is, a first plate-like permanent magnet 10 provided externally of the neck portion 6 in opposing relationship with the pole-piece 8 and a second permanent magnet 11 provided symmetrically with repsect to said first permanent magnet 10 with the center of the neck portion 6 as reference. The permanent magnets 10 and 11 are placed in a plane perpendicular to the axis of the neck portion 6 and supported on the fore ends of supporting rods 12 and 13 respectively so that they can be rotated in the plane perpendicular to the tube axis. By moving the supporting rods 12 and 13 in directions perpendicular with respect to the axis of the neck portion 6 as indicated by arrows, the perment mangets 10 and 11 can be moved toward or away from the neck portion 6. In FIGURE 3, the pole-piece 8 is associated with the "blue" electron gun 9, the pole-piece 8′ with the "green" electron gun 9′, and the pole-piece 8″ with the "red" electron gun 9″.

Figure 4:
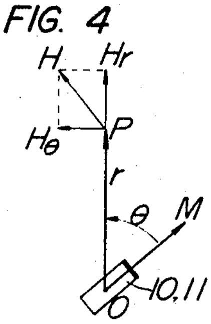
FIGURE 4 is a vector diagram showing the magnetic field distribution as a magnetic dipole is placed at a point in space.

The basic functions of the permanent magnets 10 and 11 will be described in connection with FIGURE 4 which is a view useful for explaining the operation of the present device. An attempt is made to seek a vector |*r* at a point P spaced a distance *r* apart from the center O of the plate-like permanent magnet 10 or 11. Assuming that the magnetic moment of the permanent magnets 10 and 11 is M, then the magnetic potential U at said point P is given by $$U=\frac{1}{4\pi\mu_o}\cdot\frac{(M\|r)}{r^3}=\frac{1}{4\pi\mu_o}\cdot\frac{M\cos\theta}{r^2} \quad (1)$$

where $\theta$ is the angle between the direction of the magnetic moment M| and that of the vector |r, and $\mu_0$ is permeability. From this, the component $H_r$ of the magnetic field |H in the direction of the vector |r and the component $H_\theta$ in the direction of $\theta$ are given by the following equations, respectively.

$$H_r=-\frac{\partial U}{\partial r}=\frac{1}{4\pi\mu_0}\cdot\frac{2M\cos\theta}{r^3} \quad (2)$$

$$H_\theta=-\frac{\partial U}{r\partial\theta}=\frac{1}{4\pi\mu_0}\cdot\frac{M\sin\theta}{r^3} \quad (3)$$

By eliminating $\theta$ from Equations 2 and 3, the locus of the vector |H as the permanent magnets 10 and 11 are rotated is represented by $$\frac{H_r^2}{(2K)^2}+\frac{H_\theta^2}{K^2}=1 \quad (4)$$

where $$K=\frac{1}{4\pi\mu_0}\cdot\frac{M}{r^3}$$

Figure 5:
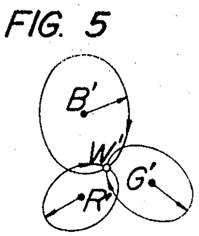
FIGURE 5 is a view showing the state of the static convergence with respect to the beam spots in the vicinity of the center of the screen which takes place in the FIGURE 3 device which is not subjected to convergence correction.

Equation 4 defines an ellipse of which the longer diameter is twice as large as the shorter diameter. Thus, a beam is caused to effect an elliptical motion at the point P. By applying such motion to the arrangement of FIGURE 3, it is possible to produce a convergence action as shown in FIGURE 5. That is, in case no convergence correction is effected, the electron beam spots are moved from the positions R′, G′ and B′ respectively, and the beam spots R and G are first brought into register with each other at a point W. This can be achieved by rotating and moving upward or downward the permanent magnet 11, by virtue of the fact that the closer to the neck portion is positioned the magnet 11, the greater becomes the displacement of the beam spots. Next, the beam spot B is brought into register with the point W′ by rotating and moving the permanent magnet 10. Thus, in accordance with this invention, the function which has conventionally been provided by separate "red" and "green" static convergence magnets can be achieved by means of the single permanent magnet 11, and also the function provided by "blue" static convergence magnet and "blue lateral" magnet can be achieved by means of the permanent magnet 10.

Figure 6:
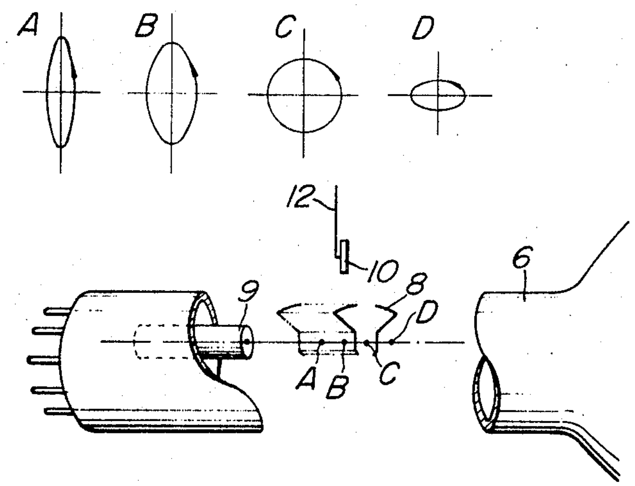
FIGURE 6 is a view similar to FIGURE 5, wherein the influence of the pole-pieces upon the electron-guns is taken into consideration.

The above calculations were made on the assumption that a simple magnetic dipole is located in a space. In the actual structure as shown in FIGURE 3, however, the pole pieces 8, 8′, 8″ have a considerably great effect on the magnetic field distribution. That is, by changing the positions of the permanent magnets 10 and 11, namely, by positioning these magnets before or after the electron guns, the shape of the ellipse is varied, as indicated at A, B, C and D of FIGURE 6. FIGURE 6 shows the case of the permanent magnet 10. The optimum position of the permanent magnet 10 may be such that the shape of the ellipse becomes a most desirable one. In general, such an ellipse as shown in FIGURE 6B is considered to be desirable, since the errors of the electron guns occurring in the manufacture thereof are less in the lateral direction and more in the radial direction.

Description will now be made of the concrete device of the present invention. Referring to FIGURES 7*a* and 7*b*, the shapes of the neck portion 6, pole-pieces 8, 8′, 8″, electron guns 9, 9′ 9″ and shielding plate 7 are the same as those described with reference to FIGURE 3. A plastic case of such a shape as illustrated and denoted by 14 in FIGS. 7*a* and 7*b* is provided externally of and around that part of the neck portion 6 which is opposed to the pole pieces 8, 8′ and 8″, so that there are defined two spaces between the plastic case 14 and the neck portion 6 in opposing relationship with each other. Within these two spaces thus defined, there are accommodated U-shaped dynamic convergence yokes 15 and 16 and disk-like static convergence permanent magnets 10 and 11 according to this invention, respectively. The dynamic convergence yokes 15 and 16 also constitute a novel convergence device, but since they have no direct relation to the present invention, description thereof will be omitted. Each of the disk-like permanent magnets 10 and 11 has its outer periphery serrated so that it can easily be rotated manually. Also, the magnets 10 and 11 are magnetized in N polarity at a point marked *o* and in S polarity at a point marked *x*, and they are rotatably supported on shafts 17 and 18, respectively. The shafts 17 and 18 are respectively inserted in support members 19 and 20 each formed by two non-magnetic plates arranged in parallel with each other, thus permitting the permanent magnets 10 and 11 to be moved upward and downward. L-shaped ferromagnetic plates 21 and 22 are provided on the rear end portions of the support members 19 and 20, respectively. These ferromagnetic plates 21 and 22 are adapted to bridge the N and S poles of the permanent magnet so as to produce a shielding effect when the permanent magnets are positioned most remotely of the pole-pieces, that is, when convergence correction is not required or the extent of convergence correction required is very slight. In FIGURE 7, the reference numeral 23 represents a convergence board, 24 a dynamic convergence thumb provided on the convergence board 23, 25 a purity magnet, and 26 a deflecting yoke. The correction is effected through the rotation and upward or downward movement of the permanent magnets 10 and 11.

Another embodiment of this invention will now be described with reference to FIGURES 8*a* and 8*b*. In FIGURE 8*a*, the shapes of neck portion 6, shielding plate 7, pole-pieces 8, 8′, 8″, and electron guns 9, 9′, 9″ are the same as those in FIGURE 3. Dynamic convergence yokes 15 and 16, the former of which being provided on a wall portion of the neck portion 6 in opposing relationship with the pole-piece 9 and the latter being provided on the opposite wall portion, are the same as those in FIGURE 6, and therefore description thereof will be omitted.

A permanent magnet 27 disposed in opposing relationship with the pole-piece 8 and a permanent magnet 28 provided symmetrically with respect to said permanent magnet 27 with the axis of the neck portion as reference are cylindrical, their axes are perpendicular to the neck portion 6. Each of these cylinders is divided into two sections in a plane normal to the neck portion 6 so that one of the sections is magnetized in N polarity and the other section is magnetized in S polarity. Supporting rods 29 and 30 are attached to end portions of the permanent magnets 27 and 28, respectively. The magnets 27 and 28 are turned by rotating thumbs 31 and 32 provided on the fore ends of the supporting rods 29 and 30.

The permanent magnets 27 and 28 are inserted in plastic holders 33 and 34 each configured in the form of a hollow rectangular parallelepiped, respectively, and the magnets 27 and 28 are always disposed in contact with plate-like soft iron pieces 35 and 36 forming a portion of one inner wall of the holders 33 and 34, respectively. These magnets 27 and 28 are rotated to be displaced in contact with the soft iron pieces 35 and 36. The holders 33 and 34 are moved perpendicularly with respect to the axis of the neck portion 6, and simultaneously the permanent magnets 27 and 28 are also moved.

The above soft iron pieces 35 and 36 may be formed of any magnetic material of less residual magnetism.

The device as shown in FIGURE 8 performs substantially the same operation as that of the device shown in FIGURE 3. That is, assuming that the permanent magnets 27 and 28 have their S poles placed in contact with the soft iron pieces 35 and 36 respectively, then the opposite portions of the soft iron pieces 35 and 36 are magnetized in S polarity. This corresponds to the provision of the same permanent magnets as 10 and 11 of FIGURE 3. If the permanent magnets 27 and 28 have their borders between the N and S poles placed in contact with the soft iron pieces 35 and 36, then the soft iron pieces 35 and 36 are not magnetized so that no action is produced. In this case, the permanent magnets 27 and 28 become equivalent to the permanent magnets 10 and 11 of FIGURE 3 rotated through 90 degrees. Thus, by suitably rotating the permanent magnets 27 and 28, it is possible to produce the same effect as produced by rotation of the permanent magnets 10 and 11 of FIGURE 3.

In the device of FIGURE 8, the axes of rotation of the permanent magnets 27 and 28 are changed through 90 degrees from those in FIGURE 3, so that the permanent magnets 27 and 28 can be more easily rotated.

If the soft iron pieces 35 and 36 are too wide, the N and S poles of the permanent magnets 27 and 28 are shorted thereby, resulting in a decreased sensitivity, while if they are too narrow, the magnetic field in the radial direction becomes weak, resulting in a flat ellipse.

As described above, in accordance with this invention, "static convergence" and "blue lateral" can be effected by the use of only two magnets, in contrast to the prior art wherein four magnets have been used for the same purposes.

What is claimed is:

1. A static convergence device for a color television receiver, comprising a triple-gun color picture tube, three pole-pieces provided inside said picture tube symmetrically to each other, the axis of symmetry being the axis of said picture tube, a first double-pole-magnetized magnet provided outside said picture tube in opposing relationship with one of said pole-pieces, said first magnet being movable in directions perpendicular to the axis of said picture tube and rotatable about an axis parallel to the axis of said picture tube, a second double-pole-magnetized magnet provided symmetrically to said first magnet, the axis of symmetry being the axis of said picture tube, said second magnet being movable in directions perpendicular to the axis of said picture tube and rotatable about an axis parallel to the axis of said picture tube, and two post-like magnetic members formed of a magnetic material with less residual magnetism, said magnetic members being positioned perpendicularly with respect to the axis of said picture tube and adapted to be moved together with said magnets wihle said magnetic members always have one end thereof disposed in contact with said magnets, wherein the state of magnetization of said post-like magnetic members is varied through the rotation of said magnets.

2. A static convergence device for a color television receiver as set forth in claim 1, wherein each of said magnets is configured into the form of a cylinder, one half of said cylinder being magnetized as N pole and the other half being magnetized as S pole, said cylinder is rotatable about its own axis, and a post-like magnetic member is disposed in contact with the side wall of each cylinder-like magnet.

3. A static convergence device for a color television receiver having a triple-gun color picture provided with three pole pieces positioned inside and symmetrically to one another with respect to the axis of said picture tube, characterized in that the device includes in combination a pair of rotatable magnets both provided outside said picture tube and arranged in such a manner that one of said pair of rotatable magnets is cooperatively associated with one of said pole pieces and the other rotatable magnet of said pair is cooperatively associated with the other two pole pieces, said pair of rotatable magnets being symmetrical to each other with respect to the axis of said picture tube and movable in directions perpendicular to the axis of said picture tube.

4. A static convergence device for a color television receiver as set forth in claim 3, wherein the axes of rotation of said pair of rotatable magnets are parallel to the axis of said picture tube and both of said pair of rotatable magnets are double-poled.

5. A static convergence device for a color television receiver as set forth in claim 4, wherein said pair of magnets are rotatable bar magnets having the N and S poles at the opposite ends.

6. A static convergence device for a color television receiver as set forth in claim 4, wherein said pair of magnets are rotatable disk-like magnets having the N and S poles at the opposite halves of each magnet.

7. A static convergence device for a color television receiver as set forth in claim 6, wherein each of said disk-like magnets is rotatably mounted on a support shaft parallel to the axis of said picture tube and each said shaft is movably carried by a guide rail of a non-magnetic material perpendicular to the axis of said picture tube for said movement.

8. A static convergence device for a color television receiver as set forth in claim 7, wherein a shorting ferromagnetic plate is provided at the end of each of said guide rails remote from said pole pieces so that when adjustment of static convergence is hardly required said magnets are substantially made non-operative by said shorting plate.

9. A static convergence device for a color television receiver as set forth in claim 3, wherein the axes of rotation of said pair of rotatable magnets are perpendicular to the axis of said picture tube and both of said pair of rotatable magnets are double-poled.

10. A static convergence device for a color television receiver as set forth in claim 9, wherein each of said pair of rotatable magnets consists of a cylinder of a magnetic material arranged perpendicularly to the axis of said picture tube and having the N and S poles defined by a plane longitudinally halving the cylinder and is contacted with one end of an individual piece of a magnetic material having a small residual magnetism, said piece of a magnetic material being adapted to be moved together with said cylindrical magnet keeping in contact therewith so that the state of magnetization of said pieces of a magnetic material may be varied through the rotation of said cylindrical magnets.

References Cited

UNITED STATES PATENTS

| | | | |
|---|---|---|---|
| 2,634,381 | 4/1953 | Kafka | 313—76 |
| 2,825,835 | 3/1958 | Heppner | 313—77 |
| 2,880,339 | 3/1959 | Kroger | 315—13 X |
| 2,880,340 | 3/1959 | Armstrong | 315—13 |
| 3,002,120 | 9/1961 | Clay | 315—13 |
| 3,354,337 | 11/1967 | De Both | 313—77 |
| 2,717,323 | 9/1955 | Clay | 313—77 |

RODNEY D. BENNETT, Jr., *Primary Examiner.*

MALCOLM F. HUBLER, *Assistant Examiner.*

U.S. Cl. X.R.

313—84